July 28, 1959     O. G. STONE     2,896,983
PIVOTED COUPLING AND SHIM THEREFOR
Filed April 8, 1955
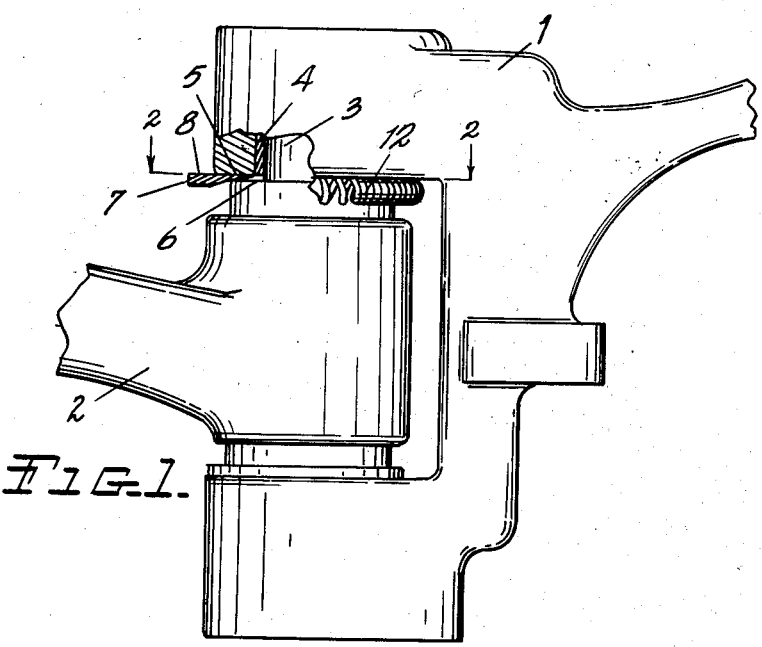
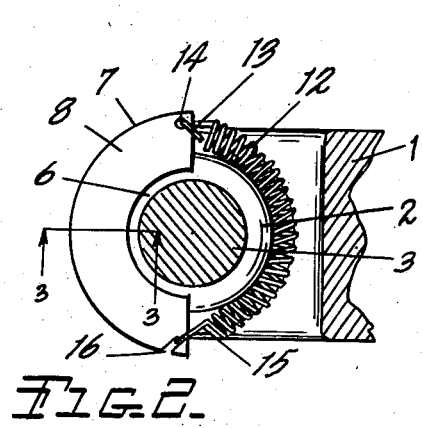
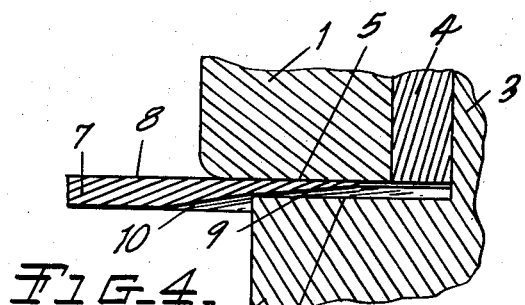
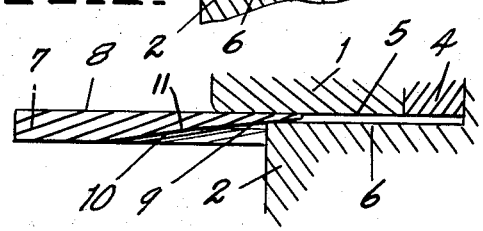
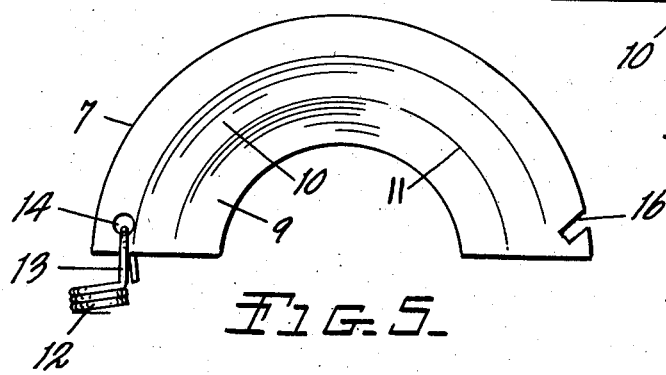
INVENTOR.
Orton G. Stone
BY Otis A. Earl
Attorney United States Patent Office 2,896,983
Patented July 28, 1959

2,896,983

PIVOTED COUPLING AND SHIM THEREFOR

Orton G. Stone, Bloomingdale, Mich.

Application April 8, 1955, Serial No. 500,248

3 Claims. (Cl. 287—100)

This invention relates to pivoted couplings or joints, such as steering assemblies, and shims therefor.

The main objects of this invention are:

First, to provide a shim for a pivoted coupling or joint, such for example, as a steering assembly for motor vehicles, which is highly efficient in compensating for looseness or wear in the joint or coupling for a long period of use.

Second, to provide a shim adapted for use in the specified and similar relations which can be quickly and easily applied, and automatically adjusts itself to compensate for end thrust wear between the joint members.

Third, to provide a coupling or joint assembly of this class with a shim which automatically compensates for or takes up end thrust wear of the assembly.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevational view of a steering assembly knuckle or coupling embodying my invention.

Fig. 2 is a fragmentary view on a line corresponding to line 2—2 of Fig. 1.

Fig. 3 is a fragmentary view in section on a line corresponding to line 3—3 of Fig. 2.

Fig. 4 is a fragmentary view corresponding to that of Fig. 3 showing the shim in another position such as might result from the use of the same joint or coupling.

Fig. 5 is an inside plan view of the shim of my invention, the mounting on the spring being partially broken away.

In the accompanying drawing, 1 represents a forked coupling or joint member, and 2 the coacting member provided with journals 3 engaging the forks or arms of the member 1. 4 represents a bushing for the bearing in the fork member 1.

These parts illustrated, are parts of the steering assembly of an automobile or other motor vehicle.

The opposed end thrust bearing surfaces 5 and 6 of the joint members 1 and 2 are commonly subject to quite rapid wear as a result of the pivotal movement and vibrations to which they are subjected in use. In the event of any substantial wear, the joint becomes noisy.

It is common practice when the joint becomes loose, as the result of wear of the opposed end thrust surfaces, to insert annular shims which necessitates the disassembling of the joint. The shim 7 of my invention is in the form of a segment preferably 180° in extent and has a flat outer side 8 and an inwardly beveled inner side, the beveled surface of the inner side has concentric beveled areas 9 and 10 of different pitch, the pitch of the inner beveled area is less than that of the surrounding area and merges into the same as shown at 11.

The helically coiled attaching spring 12 is provided with a loop or hook 13 at one end which is engaged in the hole 14 at one end of the shim. The hole is disposed closely adjacent to the outer edge of the shim. The other end of the spring is provided with a hook 15 detachably engageable with the slot 16 in the shim which slot opens to the outer edge of the shim.

The shim is disposed with its outer flat side 8 against the flat surface 5 of the joint member 1 and with its beveled inner side engagement with the thrust bearing surface 6 of the joint member 2.

In installing, the spring 12 is passed around the joint member 2 between the arms of the yoke and engaged with the slot 16 with the spring under tension. This not only retains the shim but applies spring thrust thereto to take up or compensate for any wear between the opposed end thrust bearing surfaces of the joint members.

In Fig. 3 the shim is illustrated as being in an initial position, while in Fig. 4 it is illustrated in a position after it has moved inwardly, as a result of wear.

The forming of the shim with beveled areas of substantial width and of varying pitch adds greatly to the life or usefulness of the shim and also adapts the same for insulation in joints or couplings having varying amounts of wear or varying degrees of looseness at the time of installation.

The shim may be very quickly applied or installed and is self-adjusting for a long period of use.

Having thus described the invention, what is claimed as new and is desired to be secured by Letters Patent is:

1. A shim adapted for use in journal connected couplings, the shim comprising a body member having a concavely curved edge, a flat side surface extending along and radially outwardly from said edge, and a beveled side surface on the opposite side from said flat surface comprising concentric beveled areas of substantial radial width extending outwardly from said edge and of substantially different pitch, the pitch of the inner area adjacent said edge being substantially less than that of the surrounding area and merging into the same, the body member having a hole adjacent one end thereof and an outwardly opening notch in its outer edge adjacent the other end thereof, and a helically coiled spring, one end of which is retainingly engaged in said hole and the other end terminating in an eye detachably engageable in said notch, the spring acting to impart yielding thrust to the body member when the shim is operatively associated with coacting journalled coupling members.

2. A shim adapted for use in journal connected couplings, the shim comprising a body member having a concavely curved edge, a flat side surface extending along and radially outwardly from said edge, and a beveled side surface on the opposite side from said flat surface comprising concentric beveled areas of substantial radial width extending outwardly from said edge and of substantially different pitch, the pitch of the inner area adjacent said edge being substantially less than that of the surrounding area and merging into the same, and a helically coiled spring retainingly engaged with one end of the shim body member and detachably engageable with the other end thereof for imparting yielding thrust to the body member when it is in assembled relation with a journalled coupling.

3. A shim adapted for use with pivotally connected coupling members having opposed thrust bearing surfaces, the shim comprising a segmental body member having a flat side engageable with one of a coacting pair of the coupling members and having a concavely curved edge and a beveled side surface opposed to the flat side and comprising concentric beveled areas of substantial radial width extending outwardly from said edge and of substantially different pitch, the pitch of the inner area adjacent said edge being substantially less than that of the surrounding area and merging into the same, and an extension spring connected to the ends of said shim for applying yielding pressure thereto when the shim is assembled in a coupling.

References Cited in the file of this patent

UNITED STATES PATENTS

| | | |
|---|---|---|
| 1,951,537 | Thompson | Feb. 1, 1932 |
| 2,716,033 | Dodge | Aug. 23, 1955 |